(12) United States Patent
Powell (10) Patent No.: US 7,664,699 B1
(45) Date of Patent: Feb. 16, 2010

(54) AUTOMATIC GENERATION OF TEMPORARY CREDIT CARD INFORMATION

(75) Inventor: Brian Powell, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 418 days.

(21) Appl. No.: 11/315,508

(22) Filed: Dec. 21, 2005

(51) Int. Cl.
*G06Q 40/00* (2006.01)
(52) U.S. Cl. .......................................... 705/39; 705/35
(58) Field of Classification Search .................. 705/35, 705/39
See application file for complete search history.

(56) References Cited

U.S. PATENT DOCUMENTS

| | | | |
|---|---|---|---|
| 2003/0028481 A1* | 2/2003 | Flitcroft et al. | 705/39 |
| 2003/0080183 A1* | 5/2003 | Rajasekaran et al. | 235/379 |
| 2004/0139004 A1* | 7/2004 | Cohen et al. | 705/39 |
| 2005/0154643 A1* | 7/2005 | Doan et al. | 705/26 |
| 2006/0006223 A1* | 1/2006 | Harris | 235/379 |
| 2006/0016880 A1* | 1/2006 | Singer et al. | 235/380 |

FOREIGN PATENT DOCUMENTS

WO WO 2005064842 A1 * 7/2005

OTHER PUBLICATIONS

Virtual credit card programs Bankrate.com copywrite 2004, www.archive.org/web/20040623162129/http://222.bankrate.com/brm/news/cc/200201011b.asp 3 pages.*
U.S. Appl. No. 10/979,589, entitled "Automatic Generation of Disposable E-mail Addresses" to Shaun Cooley, and filed Nov. 1, 2004.

* cited by examiner

*Primary Examiner*—James P Trammell
*Assistant Examiner*—Mary Gregg
(74) *Attorney, Agent, or Firm*—Gunnison, McKay & Hodgson, L.L.P.; Serge J. Hodgson (57) ABSTRACT

Temporary credit card information is automatically obtained and input to online credit card purchases allowing users to protect their actual credit card information from interception while shopping online.

19 Claims, 3 Drawing Sheets

AUTOMATIC GENERATION OF TEMPORARY CREDIT CARD INFORMATION

BACKGROUND OF THE INVENTION

1. Field of the Invention

The present invention relates to computer systems. More particularly, the present invention relates to the automatic generation of temporary credit card information for an online credit card transaction.

2. Description of Related Art

Currently some credit cards users can open a web browser, login to their bank's web site over a network, such as the Internet, and manually request generation of a temporary credit card number for use in making an online purchase. When the temporary credit card number is returned to the user, the user then manually inputs the temporary credit card number obtained from the bank's web site into the online purchase transaction. This process is time consuming and typically requires a user to open another web browser, which leads the credit card user to not request a temporary credit card number.

SUMMARY OF THE INVENTION

According to one embodiment, a method includes stalling a credit card transmission on a computer system. In some embodiments, the credit card transmission is stalled at a network level on a host computer system. In some embodiments, the credit card transmission is stalled at a web browser level on a host computer system.

Temporary credit card information is automatically obtained from a temporary credit card information supplier, for example, over a network, and automatically input to the credit card transmission. In some embodiments the temporary credit card information replaces actual credit card information in the credit card transmission. In some embodiments the temporary credit card information is pre-filled into credit card information fields present in a user interface.

The credit card transmission including the temporary credit card information rather than actual credit card information is released and allowed to proceed to a vendor computer system over a network. In some embodiments, a transaction confirmation is provided.

Embodiments described herein automatically obtain and input temporary credit card information to online credit card transactions prior to transmission over the network allowing users to protect their actual credit card information from interception while shopping online.

Embodiments described herein are best understood by reference to the following detailed description when read in conjunction with the accompanying drawings.

BRIEF DESCRIPTION OF THE DRAWINGS

FIG. 2 is a key to FIGS. 2A and 2B which illustrate a flow diagram of a method for automatically obtaining and inputting temporary credit card information to a credit card transmission in accordance with one embodiment of the invention.

Common reference numerals are used throughout the drawings and detailed description to indicate like elements.

DETAILED DESCRIPTION

To enhance the security of online credit card purchases, some financial institutions, such as banks, permit a credit card holder to request generation of a temporary credit card number for use in the online credit card purchase. The temporary credit card number is typically a number for one-time use that is different from the credit card holder's actual credit card number. The temporary credit card number is for use in the online credit card purchase and in place of the credit card holder's actual credit card number.

Typically the credit card holder begins an online credit card purchase on a computer system through a web browser with a vendor website. The user typically reaches a point in the online purchase at which credit card information is required to complete the purchase.

If the credit card holder wants to obtain a temporary credit card number for use in the online purchase rather than use an actual credit card number, the credit card holder is typically required to open another browser, manually locate and access the bank's website, navigate the bank's web site to a location where a temporary credit card number can be requested, and then to manually request the generation of the temporary credit card number.

The bank generates the temporary credit card number and provides it to the credit card holder. The credit card holder then returns to the online purchase with the vendor website and manually inputs the temporary credit card number into the purchase for transmission to the vendor. This process can be difficult and time consuming for credit card holders such that many credit card holders do not request generation of a temporary credit card number.

Embodiments in accordance with the invention automatically obtain temporary credit card information from a temporary credit card information supplier, such as a bank, credit card company, or other financial institution, and automatically input the temporary credit card information to an online credit card transaction, e.g., an online credit card purchase, without the user having to manually obtain and input the temporary credit card information.

Figure 2A:
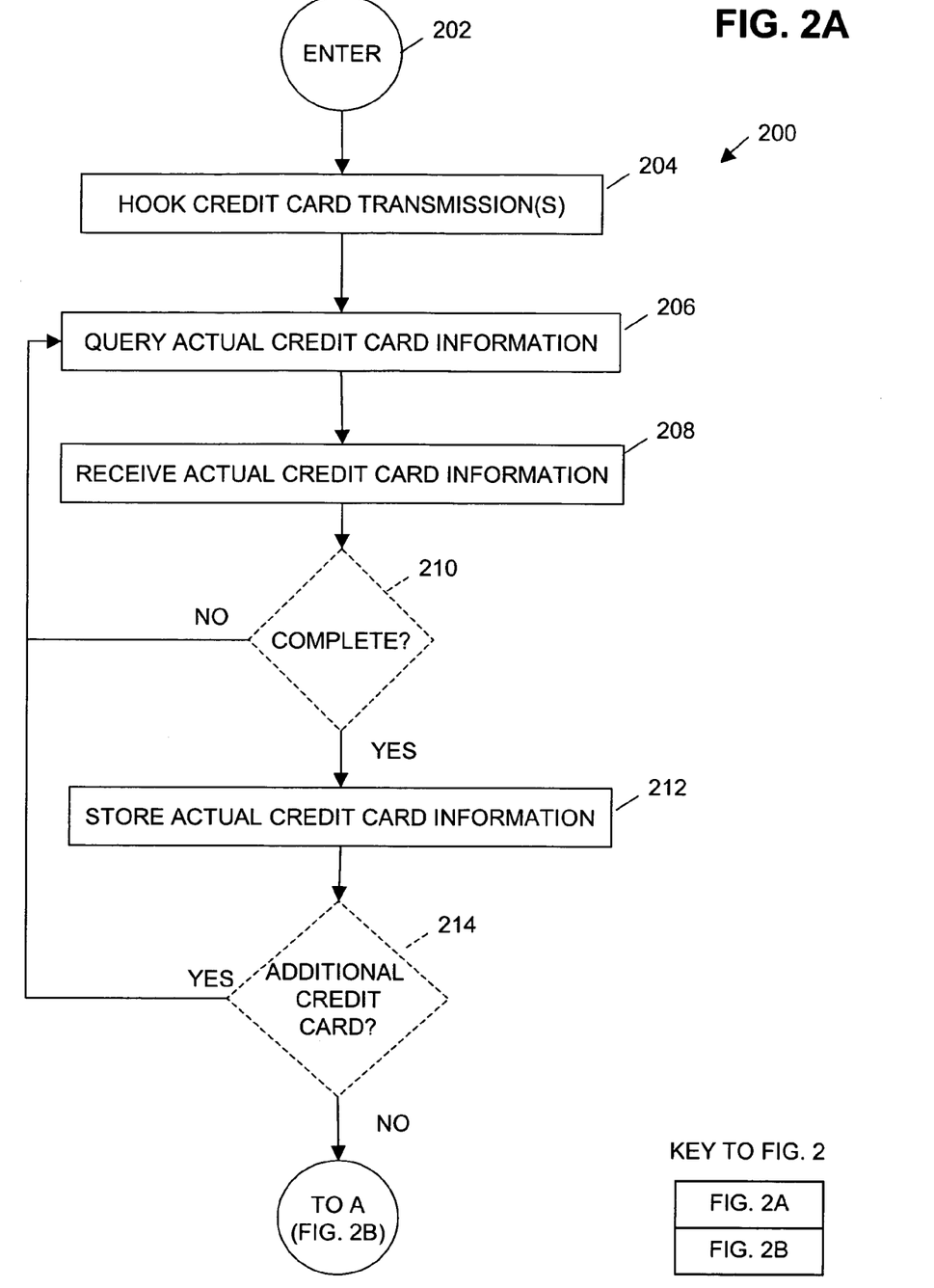
Figure 2B:
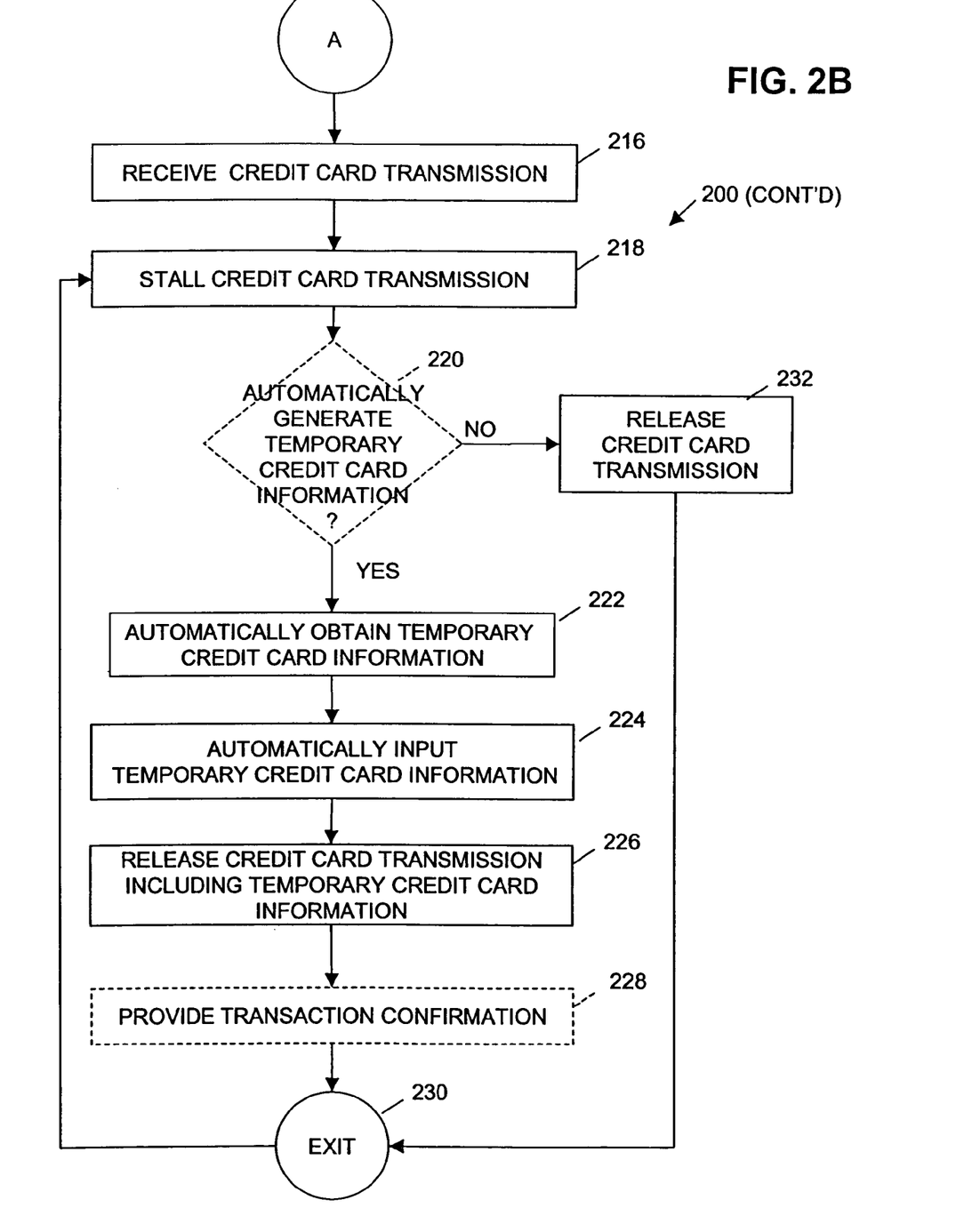

Referring generally to FIG. 2, according to one embodiment, a method includes hooking credit card transmissions (operation 204) on a computer system. Actual credit card information associated with a user's credit card is obtained, such as by querying the user (operations 206, 208) and stored (operation 212). When a credit card transmission is received (operation 216), the credit card transmission is stalled (operation 218).

Temporary credit card information is automatically obtained from a temporary credit card information supplier (operation 222) and the temporary credit card information is automatically input to stalled credit card transmission (operation 224). In some embodiments, actual credit card information present in the credit card transmission is replaced with the temporary credit card information. In some embodiments, the temporary credit card information is pre-filled into the stalled credit card transmission. The stalled credit card transmission including the temporary credit card information is released (operation 226) and allowed to complete.

Optionally, in some embodiments, a transmission confirmation is provided to the user (operation 228). In some embodiments, prior to automatically obtaining the temporary credit card information, the user is queried whether or not to automatically generate temporary credit card information for the credit card transmission.

Embodiments described herein automatically obtain and input temporary credit card information to credit card transmissions allowing users to protect their actual credit card information from interception while shopping online. Embodiments described herein further assist users by mitigating the efficacy of phishing attacks and other fraudulent actions by automatically inputting temporary credit card information rather than actual credit card information.

Figure 1:
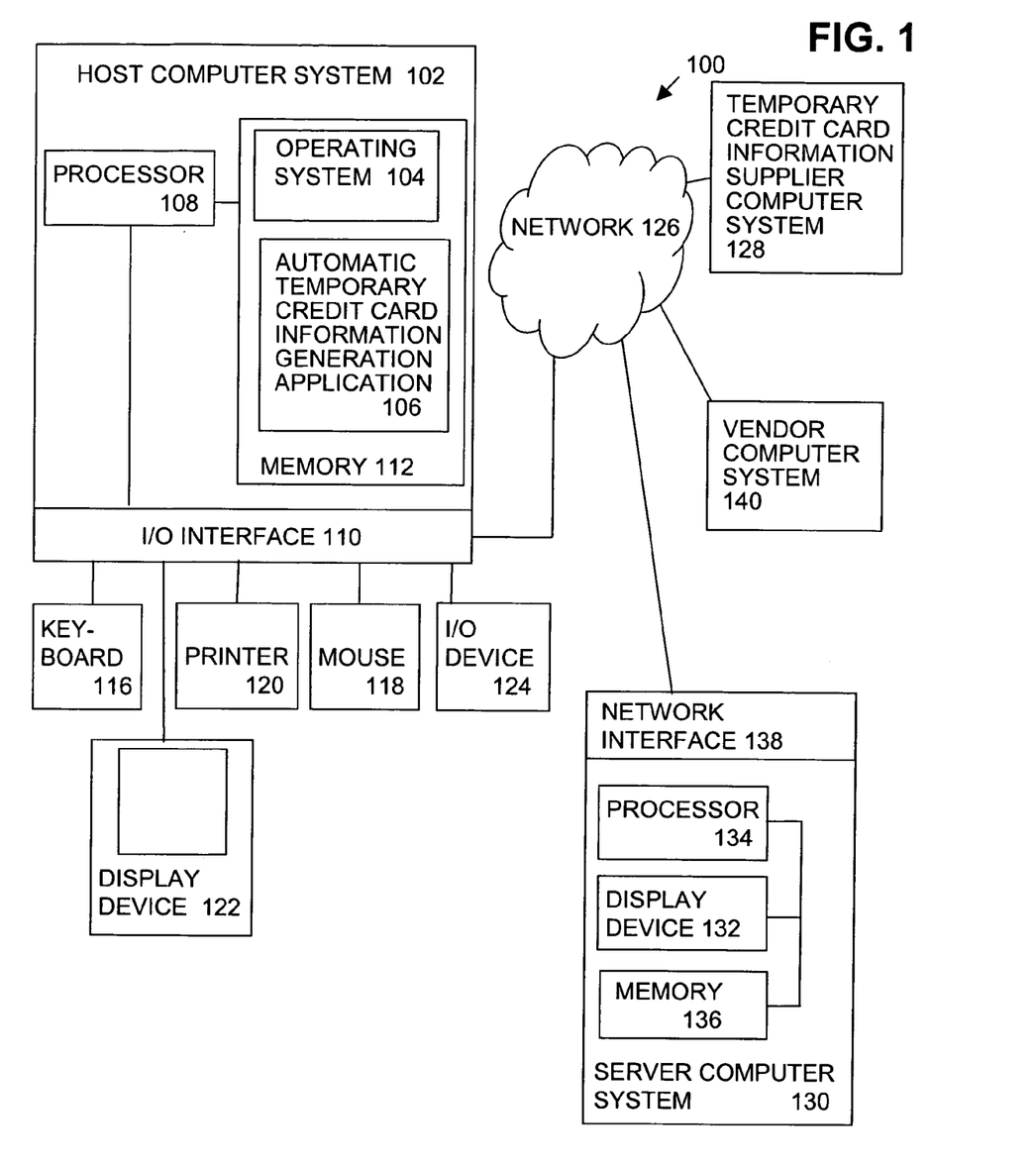
FIG. 1 is a diagram of a client-server system that includes an automatic temporary credit card information generation application executing on a host computer system in accordance with one embodiment of the invention.

Referring now to FIG. 1, FIG. 1 is a diagram of a client-server system 100 that includes an automatic temporary credit card information generation application 106 executing on a host computer system 102, e.g., a first computer system, in accordance with one embodiment. Host computer system 102, sometimes called a client or user device, typically includes a central processing unit (CPU) 108, hereinafter processor 108, an input/output (I/O) interface 110, and a memory 112. In one embodiment, memory 112 includes an operating system 104 such as a page-based virtual memory system that uses pages, e.g., memory areas.

For example, Windows® 2000 and Windows® NT are 32-bit operating systems widely used on home and business computer systems. Windows® 2000 and Windows® NT provide page-based virtual memory management schemes that permit programs to realize a 4 GB (gigabyte) virtual memory address space. In one embodiment, when processor 108 is running in virtual memory mode, all addresses are presumed virtual addresses and are translated, or mapped, to physical addresses each time processor 108 executes a new instruction to access memory.

Conventionally, the 4 GB virtual memory address space is divided into two parts: a lower 2 GB user address space, also referred to as user mode address space, or ring 3, available for use by a program; and, a high 2 GB system address space, also referred to as kernel address space, or ring 0, reserved for use by the operating system.

To protect the integrity of the operating system code, and other kernel address space code and data structures from errant or malicious programs, and to provide efficient system security (user rights management), Windows® 2000 and Windows® NT separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, user mode programs utilize system calls, sometimes called operating system (OS) function calls, which interface between the user mode and kernel mode functions.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, automatic temporary credit card information generation application 106 is loaded into host computer system 102 via I/O device 124, such as from a CD, DVD or floppy disk containing automatic temporary credit card information generation application 106.

Host computer system 102 is coupled to a server system 130 of client-server system 100 by a network 126. Server system 130 typically includes a display device 132, a processor 134, a memory 136, and a network interface 138.

Further, host computer system 102 is coupled to a temporary credit card information supplier computer system 128 and a vendor computer system 140 by network 126. In one embodiment, temporary credit card information supplier computer system 128 is a computer system utilized by a bank, credit union, credit card company, or other service, that generates temporary credit card information associated with actual credit card information.

In one embodiment, temporary credit card information supplier computer system 128 and vendor computer system 140 are similar to server system 130 and, for example, include a central processing unit, an input output (I/O) interface, and a memory. Temporary credit card information supplier computer system 128 and vendor computer system 140 may further include standard devices like a keyboard, a mouse, a printer, a display device and an I/O device(s). The various hardware components of temporary credit card information supplier computer system 128 and vendor computer system 140 are not illustrated to avoid detracting from the embodiments described herein.

Network 126 can be any network or network system that is of interest to a user. In various embodiments, network interface 138 and I/O interface 110 include analog modems, digital modems, or a network interface card.

In one embodiment, automatic temporary credit card information generation application 106 is stored in memory 112 of host computer system 102 and executed on host computer system 102. The particular type and configuration of host computer system 102, temporary credit card information supplier computer system 128, server system 130, and vendor computer system 140 are not essential to the present embodiment.

Herein, in one embodiment, actual credit card information includes credit card information assigned by a credit card granting entity that is valid for use in making a purchase by the credit card holder and that is non-temporary. Actual credit card information can be used repeatedly by a credit card holder for different credit card purchases. Examples of actual credit card information include a number imprinted on the face of an issued credit card, an expiration date imprinted on the face of an issued credit card, and a security code, sometimes referred to as a V-code, printed on the reverse of an issued credit card.

Herein temporary credit card information includes credit card information generated and valid for a limited use, such as a one-time use, in making a purchase by a credit card holder and that is temporary. Temporary credit card information cannot be used repeatedly by a credit card holder for different credit card purchases. Examples of temporary credit card information include a temporary credit card number generated by a temporary credit card supplier that is valid for a one-time use in a purchase and that is different from the actual credit card number, a temporary credit card expiration date, and a temporary credit card security code, or temporary V-code.

Herein the use of the term credit card information without the modifiers temporary or actual, denotes generic credit card information that can be either actual credit card information or temporary credit card information. For example, a user interface in an online purchase typically includes windows or fields where credit card information can be input by a user. This credit card information can either be the actual credit card information of the user or temporary credit card information.

FIG. 2 is a key to FIGS. 2A and 2B which illustrate a flow diagram of a method 200 for automatically obtaining and inputting temporary credit card information to a credit card transmission in accordance with one embodiment of the invention. Referring now to FIGS. 1 and 2 together, in one embodiment, execution of automatic temporary credit card information generation application 106 by processor 108 results in the operations of method 200 as described below.

In the embodiments described herein it is assumed that arrangements, e.g., agreements, with temporary credit card information suppliers, such as credit card companies, banks, credit unions, or other temporary credit card information suppliers are in place. An arrangement with a temporary credit card information supplier permits automatic temporary credit card information generation application 106 to automatically obtain temporary credit card information from the temporary credit card information supplier over a network, such as network 126, in accordance with one or more operations established by the arrangement.

Thus in one embodiment, automatic temporary credit card information generation application 106 includes the means, such as operations, and related software and or hardware, including secure and/or non-secure interfaces to obtain temporary credit card information over a network from a temporary credit card information supplier in accordance with the embodiments described herein.

In the present embodiment, automatic temporary credit card information generation application 106 is installed on host computer system as a kernel mode driver. In one embodiment, method 200 is entered at an ENTER operation 202, and from ENTER operation 202, processing transitions to a HOOK CREDIT CARD TRANSMISSION(S) operation 204.

In HOOK CREDIT CARD TRANSMISSION(S) operation 204, credit card transmissions are hooked on host computer system 102. Herein in one embodiment a credit card transmission is any communication, such as a data packet or web browser interface that includes credit card information or includes fields for credit card information for direct or indirect transmission to a vendor computer system.

In one embodiment, automatic temporary credit card information generation application 106 includes a kernel mode proxy driver component that intercepts credit card transmissions at a network level on host computer system 102. In one embodiment, the kernel mode proxy driver intercepts network traffic for output on selected ports of host computer system 102 and analyzes the network traffic for the presence of actual credit card information, such as an actual credit card number.

In one embodiment, network transmissions identified for sending over selected ports on host computer system 102, such as port 80 (HTTP traffic) and port 443 (HTTPS traffic) are hooked such that the network transmissions are directed to the kernel mode proxy driver prior to transmission over the selected port.

In one embodiment, the kernel mode proxy driver monitors network traffic on the selected ports for use of the user's actual credit card information. In one embodiment the kernel mode proxy driver monitors network traffic on the selected ports for use of the user's actual credit card number in any format, for example, in an uninterrupted format such as 1111111111111111 or in a hyphenated format such as 1111-1111-1111-1111.

For example, a user enters an actual credit card number into a user interface associated with vendor computer system 140 and displayed on host computer system 102. The user then selects "SUBMIT" on the user interface resulting in a transmission of the input actual credit card number from the user interface to a port, such as port 80, for output to vendor computer system 140. The actual credit card number entered by the user is detected in the credit card transmission by the kernel mode proxy driver prior to output to network 126 over port 80.

Hooking of network transmissions on a host computer system by a kernel mode proxy driver is well known to those of skill in the art and not further described herein to avoid detracting from the principles of the present invention. In some embodiments, a network filter is used rather than a kernel mode proxy driver.

In an alternate embodiment, rather than intercepting a credit card transmission at a network level on host computer system 102, the credit card transmission is hooked at the web browser level on host computer system 102. In one embodiment, automatic temporary credit card information generation application 106 includes a web browser plug-in or user interface window hook component for hooking credit card transmissions at a web browser level on host computer system 102.

Herein, in one embodiment, a web browser is an application, e.g., Netscape®, Internet Explorer®, Firefox®, that allows a user to access the web and to receive and interact with various media formats, such as text, graphical, and audio formats via a user interface, such as window. Hooking of web browsers using a web browser plug-in or a user interface window hook is well known to those of skill in the art and not further described herein to avoid detracting from the principles of the invention.

Hooking user interface windows in a web browser permits automatic temporary credit card information generation application 106 to intercept and replace actual credit card information in the user interface with temporary credit card information, or to pre-fill the user interface with temporary credit card information before it is submitted and transferred to the network level. From HOOK CREDIT CARD TRANSMISSION(S) operation 204, processing transitions to a QUERY ACTUAL CREDIT CARD INFORMATION operation 206.

In QUERY ACTUAL CREDIT CARD INFORMATION operation 206, a user is queried for actual credit card information. In one embodiment, automatic temporary credit card information generation application 106 includes a user interface component for generating and displaying one or more user interfaces to the user on host computer system 102. In one embodiment the one or more user interfaces request the user's actual credit card information and allow input of the actual credit card information for return to automatic temporary credit card information generation application 106.

In one embodiment, a user is queried for one or more items of actual credit card information. Examples of items of actual credit card information include an actual credit card number, an actual credit card expiration date, an actual credit card security code, the credit card holder's name as it appears on the issued credit card. In some embodiments, other information associated with the actual credit card information is requested from the user, such as the credit card type, e.g., Visa, Mastercard, American Express, and the name of the credit card issuer. From QUERY ACTUAL CREDIT CARD INFORMATION operation 206, processing transitions to a RECEIVE ACTUAL CREDIT CARD INFORMATION operation 208.

In RECEIVE ACTUAL CREDIT CARD INFORMATION operation 208, actual credit card information received in response to operation 206 is received by automatic temporary credit card information generation application 106. In one embodiment, actual credit card information input to the user interface(s) of operation 206 is returned to automatic temporary credit card information generation application 106. From RECEIVE ACTUAL CREDIT CARD INFORMATION operation 208, processing optionally transitions to a COMPLETE check operation 210 or directly to a STORE ACTUAL CREDIT CARD INFORMATION operation 212 if optional check operation 210 is not performed.

In optional COMPLETE check operation 210, the actual credit card information received from the user in operation 208 is evaluated to determine whether the actual credit card information requested in operation 206 is complete. For example, in one embodiment, a determination is made whether each item of the actual credit card information requested in operation 206 is received in operation 208.

In one embodiment, when each item of actual credit card information requested in operation 206 is not received ("NO"), from COMPLETE check operation 210 processing returns to operation 206 earlier described and the user is again queried for the actual credit card information. In some embodiments, different or modified user interface(s) are displayed to the user to highlight, or otherwise specify the items of actual credit card information not received.

Referring again to COMPLETE check operation 210, alternatively, in one embodiment, when each item of actual credit card information requested in operation 206 is received ("YES"), from COMPLETE check operation 210, processing transitions to STORE ACTUAL CREDIT CARD INFORMATION operation 212.

In STORE ACTUAL CREDIT CARD INFORMATION operation 212, the actual credit card information received in operation 208 is stored in a memory structure accessible by automatic temporary credit card information generation application 106. In one embodiment, the actual credit card information received in operation 208 is securely stored, such as by encrypting the information, or otherwise securing the actual credit card information.

Thus, in one embodiment, automatic temporary credit card information generation application 106 includes a credit card information securing component for securely storing actual credit card information received from a user. From STORE ACTUAL CREDIT CARD INFORMATION operation 212 processing optionally transitions to an ADDITIONAL CREDIT CARD check operation 214 or directly to a RECEIVE CREDIT CARD TRANSMISSION operation 216 if optional check operation 214 is not performed.

In ADDITIONAL CREDIT CARD check operation 214 a determination is made whether the user wants to enter actual credit card information for another credit card. In one embodiment, one or more user interfaces are displayed to the user requesting whether the user wants to input actual credit card information for another credit card and allowing user input and submission of the response. When a response is returned from the user indicating that the user wants to enter actual credit card information for another credit card ("YES"), processing transitions from ADDITIONAL CREDIT CARD check operation 214 and returns to operation 206 with the user being queried for actual credit card information related to a next credit card.

Referring again to ADDITIONAL CREDIT CARD check operation 214, alternatively, when a response is received from the user indicating that the user does not want to enter actual credit card information for another credit card ("NO"), processing transitions from ADDITIONAL CREDIT CARD check operation 214 to RECEIVE CREDIT CARD TRANSMISSION operation 216, upon receipt of a credit card transmission as further described herein.

In RECEIVE CREDIT CARD TRANSMISSION operation 216, a credit card transmission is received by automatic temporary credit card information generation application 106. For example, in one embodiment, a data packet including actual credit card information, such as an actual credit card number, identified for transmission over a selected port is redirected to automatic temporary credit card information generation application 106. In another example, actual credit card information, such as an actual credit card number, submitted as input to a field of web browser is received by automatic temporary credit card information generation application 106. In another example, a field in a user interface having one or more location for input of credit card information, such as a credit card number, is received by automatic temporary credit card information generation application 106. From RECEIVE CREDIT CARD TRANSMISSION operation 216 processing transitions to a STALL CREDIT CARD TRANSMISSION 218.

In STALL CREDIT CARD TRANSMISSION 218, the credit card transmission received in operation 216 is stalled, or otherwise prevented from transmission to the network, e.g., network 126. From STALL CREDIT CARD TRANSMISSION 218 processing optionally transitions to an AUTOMATICALLY GENERATE TEMPORARY CREDIT CARD INFORMATION check operation 220, or directly to an AUTOMATICALLY OBTAIN TEMPORARY CREDIT CARD INFORMATION operation 222 if check operation 220 is not performed.

In optional AUTOMATICALLY GENERATE TEMPORARY CREDIT CARD INFORMATION check operation 220, the user is queried whether or not to automatically generate temporary credit card information for the credit card transmission. In one embodiment, one or more user interfaces are displayed to the user requesting and allowing user input as to whether to automatically generate temporary credit card information for the credit card transmission.

The user can be queried using any one of a number of techniques, by using a pop up window, or a user interface with selections. In one embodiment, the query provides for user selection inputs, such as "YES" or "NO".

In one embodiment, when a user selects or otherwise indicates not to automatically generate temporary credit card information ("NO"), processing transitions from AUTOMATICALLY GENERATE TEMPORARY CREDIT CARD INFORMATION check operation 220 to a RELEASE CREDIT CARD TRANSMISSION operation 232. In some embodiments, upon input of a selection not to automatically generate temporary credit card information, a confidential information notification is displayed to the user warning the user that their actual credit card information is being sent out over the Internet.

In RELEASE CREDIT CARD TRANSMISSION operation 232, the credit card transmission stalled in operation 218 is released. For example, in one embodiment, where the credit card transmission is a data packet that includes actual credit card information, the credit card transmission is released with the actual credit card information.

In another example, where the credit card transmission is stalled at the web browser level, and the user interface includes a field having actual credit card information, the field is released for submission to the network level of host computer system 102. In another example, where the credit card transmission is stalled at the web browser level and the user interface includes a field for input of credit card information, the field is released and the user is permitted to input actual credit card information. From RELEASE CREDIT CARD TRANSMISSION operation 232, processing transitions to an EXIT operation 230, with processing exiting method 200, or optionally returns to operation 216 on receipt of a next credit card transmission.

Referring again to AUTOMATICALLY GENERATE TEMPORARY CREDIT CARD INFORMATION check operation 220, in one embodiment, when a user selects or otherwise indicates to automatically generate temporary credit card information ("YES"), processing transitions from AUTOMATICALLY GENERATE TEMPORARY CREDIT CARD INFORMATION check operation 220 to an AUTOMATICALLY OBTAIN TEMPORARY CREDIT CARD INFORMATION operation 222.

In AUTOMATICALLY OBTAIN TEMPORARY CREDIT CARD INFORMATION operation 222, temporary credit card information is automatically obtained from a temporary credit card information supplier associated with the credit card being used, e.g., temporary credit card information supplier computer system 128. In one embodiment, automatic temporary credit card information generation application 106 initiates one or more operations and/or transmissions with temporary credit card information supplier computer system 128 to obtain temporary credit card information for use in the stalled credit card transmission.

In one embodiment, the operations required to obtain the temporary credit card information from the temporary credit card information supplier are dependent upon the temporary credit card information supplier and can vary widely between temporary credit card information suppliers. In some embodiments, not shown, automatic temporary credit card information generation application 106 initiates operations/transmissions with temporary credit card information supplier computer system 128 as well as other related entities, as needed, to automatically obtain the temporary credit card information.

For example, in one embodiment, automatic temporary credit card information generation application 106 automatically accesses temporary credit card information supplier computer system 128, for example, over network 126, and requests temporary credit card information for use in the stalled credit card transmission. In some embodiments, temporary credit card information supplier computer system 128 requests one or more items of actual credit card information from automatic temporary credit card information generation application 106, for example, over network 126. Automatic temporary credit card information generation application 106 retrieves the one or more items of actual credit card information, e.g., from the stored actual credit card information, and returns the one or more items of actual credit card information to temporary credit card information supplier computer system 128, for example, over network 126.

Temporary credit card information supplier computer system 128 generates the temporary credit card information and supplies the temporary credit card information to automatic temporary credit card information generation application 106, for example, over network 126. Automatic temporary credit card information generation application 106 receives the temporary credit card information from temporary credit card information supplier 128, for example, over network 126.

Notably the user does not interact with temporary credit card information supplier computer system 128 during operation 222 and thus operation 222 is transparent to the user. The temporary credit card information is obtained without the user having to open a separate web browser. Further the temporary credit card information is input to the credit card transmission without the user having to input the temporary credit card information.

The user is relieved from having to manually open another web browser, access the web site of a temporary credit card information supplier and from having to navigate and interact with the temporary credit card information supplier to obtain a temporary credit card information during an online credit card purchase. From AUTOMATICALLY OBTAIN TEMPORARY CREDIT CARD INFORMATION operation 222, processing transitions to an AUTOMATICALLY INPUT TEMPORARY CREDIT CARD INFORMATION operation 224.

In AUTOMATICALLY INPUT TEMPORARY CREDIT CARD INFORMATION operation 224, some or all of the temporary credit card information obtained in operation 222 is automatically input to the stalled credit card transmission thus modifying the stalled credit card transmission to include temporary credit card information. For example, in one embodiment, actual credit card information present in the credit card transmission stalled at the network level of host computer system 102 is automatically replaced with some or all of the temporary credit card information obtained in operation 222. The user is relieved of having to manually transfer temporary credit card information manually obtained from the temporary credit card supplier website into the credit card transmission. More particularly, in this example, the user inputs and submits the actual credit card information in the credit card transmission and automatic temporary credit card information generation application 106 modifies the credit card transmission by replacing the actual credit card information input by the user with some or all of the temporary credit card information obtained in operation 222.

In another embodiment, actual credit card information present in the credit card transmission stalled at the web browser level of host computer system 102 is automatically replaced with some or all of the temporary credit card information obtained in operation 222. In this example, the user inputs the actual credit card information in the credit card transmission and automatic temporary credit card information generation application 106 modifies the credit card transmission by replacing the actual credit card information input by the user with some or all of the temporary credit card information obtained in operation 222.

In a further example, one or more credit card information fields, not having user input, in a credit card transmission stalled at the web browser level of host computer system 102 are automatically pre-filled with some or all of the temporary credit card information obtained in operation 222. In this example, the user does not input the actual credit card information in the credit card transmission and automatic temporary credit card information generation application 106 modifies the credit card transmission by inputting some or all of the temporary credit card information obtained in operation 222 into the one or more credit card information fields.

Thus, in operation 224 a stalled credit card transmission is modified to include temporary credit card information generating a modified credit card transmission. From AUTOMATICALLY INPUT TEMPORARY CREDIT CARD INFORMATION operation 224, processing transition to a RELEASE CREDIT CARD TRANSMISSION INCLUDING TEMPORARY CREDIT CARD INFORMATION operation 226.

In RELEASE CREDIT CARD TRANSMISSION INCLUDING TEMPORARY CREDIT CARD INFORMATION operation 226, the stalled credit card transmission automatically modified in operation 224 to include temporary credit card information is released. In particular, the modified credit card transmission is released and allowed to transmit to vendor computer system 140. Thus, the modified credit card transmission does not expose the user's actual credit card information during transmission. From RELEASE CREDIT CARD TRANSMISSION INCLUDING TEMPORARY CREDIT CARD INFORMATION operation 226, processing optionally transitions to a PROVIDE TRANSMISSION CONFIRMATION operation 228, or directly to EXIT operation 230 earlier described.

In optional PROVIDE TRANSMISSION CONFIRMATION operation 228, a transmission confirmation page is generated and displayed to the user. In one embodiment, the transmission confirmation page includes verification of the temporary credit card information input to the credit cards transmission as well as other information such as the amount of purchase, vendor web site, date, and time. From PROVIDE TRANSMISSION CONFIRMATION operation 228, processing transitions to EXIT operation 230 with processing exiting method 200, or optionally returns to operation 216 on receipt of a next credit card transmission.

In some embodiments, the user's responses to user interface queries are automatically stored and associated with a particular vendor website. Additionally, in some embodiments, a temporary credit card number is associated with the vendor website it was used on in order to identify fraudulent or malicious activity with specific websites. This permits a user to determine which web sites are safe. Further, in some embodiments, identification of fraudulent or malicious activity with specific web sites is sent to a central server, or security center so all users can benefit from the experiences of others.

In an alternative embodiment, automatic temporary credit card information generation application 106 is installed on a server computer system that serves as an access point to a network for one or more client computer systems, such as in a local area network (LAN). In this alternative embodiment, automatic temporary credit card information generation application 106 automatically obtains temporary credit card information for use in transactions originated at the client computer systems. In this embodiment, rather than the credit card transmissions being stalled and modified at the individual client computer systems, the credit transmissions are stalled and modified with temporary credit card information at the LAN server and then output from the LAN over a network, such as the Internet, to one or more vendor computer systems.

In the above embodiments, the generation of the temporary credit card information is performed by the temporary credit card information supplier and automatically obtained by automatic temporary credit card information generation application 106. In other embodiments, the generation of the temporary credit card information is performed by automatic temporary credit card information generation application 106 in accordance with one or more parameters identified by the temporary credit card information supplier, such as temporary credit card information algorithms, temporary credit card information encryption keys, or other temporary credit card information generation specifications.

Although automatic temporary credit card information generation application 106 is referred to as an application, this is illustrative only. Automatic temporary credit card information generation application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, automatic temporary credit card information generation application 106 is implemented as a system level, e.g., kernel mode, driver.

While embodiments have been described for a client-server configuration, an embodiment may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with the embodiments described herein. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, automatic temporary credit card information generation application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the functionality of automatic temporary credit card information generation application 106 in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of automatic temporary credit card information generation application 106 in accordance with one embodiment can be implemented in a wide variety of computer system configurations. In addition, the functionality of automatic temporary credit card information generation application 106 could be stored as different modules in memories of different devices.

For example, automatic temporary credit card information generation application 106 could initially be stored in server system 130, and then as necessary, a portion of automatic temporary credit card information generation application 106 could be transferred to host computer system 102 and executed on host computer system 102. Consequently, part of the functionality of automatic temporary credit card information generation application 106 would be executed on processor 134 of server system 130, and another part would be executed on processor 108 of host computer system 102. In view of this disclosure, those of skill in the art can implement the various embodiments described herein in a wide-variety of physical hardware configurations using an operating system and computer programming language of interest to the user.

In yet another embodiment, automatic temporary credit card information generation application 106 is stored in memory 136 of server system 130. Automatic temporary credit card information generation application 106 is transferred over network 126 to memory 112 in host computer system 102. In this embodiment, network interface 138 and I/O interface 110 would include analog modems, digital modems, or a network interface card. If modems are used, network 126 includes a communications network, and automatic temporary credit card information generation application 106 is downloaded via the communications network.

This disclosure provides exemplary embodiments. The scope of the various embodiments described herein is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
   intercepting a credit card transmission on a computer system to prevent release of said credit card transmission from said computer system to a network, wherein said credit card transmission is created by a user entering actual credit card information into a web browser and transmitting said actual credit card information from said web browser to be output to a vendor computer system connected to said computer system by said network;
   automatically obtaining temporary credit card information from a temporary credit card information supplier;
   automatically inputting some or all of said temporary credit card information to said credit card transmission to generate a modified credit card transmission comprising replacing some or all of said actual credit card information with some or all of said temporary credit card information; and
   releasing said modified credit card transmission.

2. The computer implemented method of claim 1 further comprising:
   generating a transmission confirmation including at least said temporary credit card information.

3. The computer implemented method of claim 1 wherein said credit card transmission is intercepted at a network level on said computer system.

4. The computer implemented method of claim 1 wherein said credit card transmission is intercepted at a web browser level on said computer system prior to submission to a network level of said computer system.

5. The computer implemented method of claim 1 further comprising:
   wherein said automatically obtaining temporary credit card information from a temporary credit card information supplier occurs over said network.

6. The computer implemented method of claim 1 further comprising:
   querying said user for said actual credit card information; and
   storing said actual credit card information.

7. The computer implemented method of claim 1 wherein said automatically obtaining temporary credit card information from a temporary credit card information supplier comprises:
   automatically accessing a temporary credit card information supplier computer system;
   automatically requesting said temporary credit card information from said temporary credit card information supplier computer system; and
   automatically receiving said temporary credit card information from said temporary credit card information supplier.

8. The computer implemented method of claim 7 further comprising:
   automatically providing some or all of said actual credit card information to said temporary credit card information supplier.

9. The computer implemented method of claim 1, wherein said credit card transmission includes at least one field for input of credit card information; and
   further wherein said automatically inputting some or all of said temporary credit card information to said credit card transmission to generate a modified credit card transmission, includes inputting some or all of said temporary credit card information to said at least one field for input of credit card information.

10. A computer implemented method comprising:
    hooking a credit card transmission on a computer system;
    querying a user for actual credit card information;
    receiving said actual credit card information;
    storing said actual credit card information;
    intercepting said credit card transmission to prevent release of said credit card transmission from said computer system to a network, wherein said credit card transmission is created by a user entering said actual credit card information into a web browser and transmitting said actual credit card information from said web browser to be output to a vendor computer system connected to said computer system by said network;
    automatically obtaining temporary credit card information over said network;
    automatically inputting some or all of said temporary credit card information to said credit card transmission to generate a modified credit card transmission comprising replacing some or all of said actual credit card information with some or all of said temporary credit card information; and
    releasing said modified credit card transmission.

11. The method of claim 10 further comprising:
    determining whether said received actual credit card information is complete; and
    wherein upon a determination that said received actual credit card information is not complete, querying said user for said actual credit card information not received.

12. The method of claim 10 further comprising:
    determining whether said user wants to provide actual credit card information for another credit card; and
    upon a determination that said user wants to provide actual credit card information for another credit card, querying said user for actual credit card information associated with said another credit card.

13. The method of claim 10 wherein prior to said automatically obtaining said temporary credit card information said method further comprises:
    querying said user whether to automatically obtain said temporary credit card information for said credit card transmission;
    wherein upon an input from said user not to automatically obtain said temporary credit card information, releasing said credit card transmission; and
    wherein upon an input from said user to automatically obtain said temporary credit card information, proceeding to said automatically obtaining said temporary credit card information.

14. The method of claim 10 further comprising:
    providing a transmission confirmation to said user.

15. A computer-program product comprising a computer readable storage medium containing computer program code comprising:
    an automatic temporary credit card information generation application for intercepting a credit card transmission on a computer system to prevent release of said credit card transmission from said computer system to a network, wherein said credit card transmission is created by a user entering actual credit card information into a web browser and transmitting said actual credit card information from said web browser to be output to a vendor computer system connected to said computer system by said network;

said automatic temporary credit card information generation application further for automatically obtaining temporary credit card information from a temporary credit card information supplier;

said automatic temporary credit card information generation application further for automatically inputting some or all of said temporary credit card information to said credit card transmission to generate a modified credit card transmission comprising replacing some or all of said actual credit card information with some or all of said temporary credit card information; and said automatic temporary credit card information generation application further for releasing said modified credit card transmission.

16. The computer program product of claim 15 wherein said automatically obtaining temporary credit card information from a temporary credit card information supplier comprises:

automatically accessing a temporary credit card information supplier computer system;

automatically requesting said temporary credit card information from said temporary credit card information supplier computer system; and automatically receiving said temporary credit card information from said temporary credit card information supplier.

17. The computer program product of claim 16 wherein said automatic temporary credit card information generation application is further for automatically providing some or all of said actual credit card information to said temporary credit card information supplier.

18. A computer system comprising:

a memory having stored therein an automatic temporary credit card information generation application; and a processor coupled to said memory, wherein execution of said automatic temporary credit card information generation application generates a method comprising:

intercepting a credit card transmission on a computer system to prevent release of said credit card transmission from said computer system to a network, wherein said credit card transmission is created by a user entering actual credit card information into a web browser and transmitting said actual credit card information from said web browser to be output to a vendor computer system connected to said computer system by said network;

automatically obtaining temporary credit card information from a temporary credit card information supplier for use in said credit card transmission;

automatically inputting some or all of said temporary credit card information to said credit card transmission to generate a modified credit card transmission comprising replacing some or all of said actual credit card information with some or all of said temporary credit card information; and releasing said modified credit card transmission.

19. The computer system of claim 18, wherein the method further comprises:

querying said user for said actual credit card information; and storing said actual credit card information.

\* \* \* \* \*